(12) United States Patent
Zou et al.

(10) Patent No.: US 10,401,888 B2
(45) Date of Patent: Sep. 3, 2019

(54) LOW-DROPOUT VOLTAGE REGULATOR APPARATUS

(71) Applicant: TDK Corporation, Tokyo (JP)

(72) Inventors: Lei Zou, Kobenhavn (DK); Gino Rocca, Copenhagen (DK)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/579,070

(22) PCT Filed: Jun. 18, 2015

(86) PCT No.: PCT/EP2015/063764
§ 371 (c)(1),
(2) Date: Dec. 1, 2017

(87) PCT Pub. No.: WO2016/202398
PCT Pub. Date: Dec. 22, 2016

(65) Prior Publication Data
US 2018/0173260 A1      Jun. 21, 2018

(51) Int. Cl.
*G05F 1/46*     (2006.01)
*H02M 1/00*    (2006.01)
*G05F 1/575*   (2006.01)

(52) U.S. Cl.
CPC .............. *G05F 1/575* (2013.01); *G05F 1/462* (2013.01); *H02M 2001/0045* (2013.01)

(58) Field of Classification Search
CPC ....................................................... G05F 1/46
See application file for complete search history.

(56) References Cited

U.S. PATENT DOCUMENTS 5,874,830 A * 2/1999 Baker ..................... G05F 3/247
                                                          323/316
6,703,813 B1    3/2004 Vladislav et al.
(Continued)

FOREIGN PATENT DOCUMENTS

CN          101119104 A      2/2008
CN          102830742 A      12/2012
(Continued)

OTHER PUBLICATIONS

Hazucha, Peter et al., "Area-Efficient Linear Regulator With Ultra-Fast Load Regulation." IEEE Journal of Solid-State Circuits, vol. 40, No. 4, Apr. 2005, 8 pages.

*Primary Examiner* — Kyle J Moody
*Assistant Examiner* — Trinh Q Dang
(74) *Attorney, Agent, or Firm* — Slater Matsil, LLP

(57) ABSTRACT

A low-dropout voltage regulator (LDO) apparatus is disclosed. In an embodiment, the LDO apparatus includes a voltage input connectable to a power supply, an error amplifier coupled to the voltage input and configured to receive a reference signal and a feedback signal and to generate an output control signal dependent on the reference signal and the feedback signal, and a pass transistor coupled to the error amplifier and configured to receive the output control signal of the error amplifier and to provide an output current dependent on the output control signal. The LDO apparatus further includes a detection circuit coupled to the voltage input and configured to provide an output signal on its output and a bias generator coupled to the output of the detection circuit and configured to provide a bias current on a bias input of the current adjusting circuit of the error amplifier.

8 Claims, 3 Drawing Sheets

(56) References Cited

U.S. PATENT DOCUMENTS

| | | |
|---|---|---|
| 8,289,009 B1 | 10/2012 | Strik et al. |
| 8,436,595 B2 | 5/2013 | Simmons et al. |
| 8,570,098 B2 | 10/2013 | Jinbo |
| 2005/0143045 A1 | 6/2005 | Jiguet et al. |
| 2006/0192538 A1 | 8/2006 | Wang et al. |
| 2006/0197513 A1 | 9/2006 | Tang et al. |
| 2007/0018621 A1* | 1/2007 | Mok ................. G05F 1/575 323/280 |
| 2011/0156686 A1 | 6/2011 | Gakhar et al. |
| 2013/0113447 A1 | 5/2013 | Kadanka |
| 2014/0266106 A1 | 9/2014 | El-Nozahi et al. |
| 2015/0115918 A1 | 4/2015 | Oikarinen |
| 2015/0185747 A1* | 7/2015 | Liu ................... G05F 1/565 323/268 |
| 2015/0212530 A1 | 7/2015 | Forejtek |
| 2015/0268678 A1* | 9/2015 | Yu .................... G05F 1/46 327/540 |
| 2018/0173260 A1 | 6/2018 | Zou et al. |

FOREIGN PATENT DOCUMENTS

| | | |
|---|---|---|
| CN | 107850911 A | 3/2018 |
| EP | 2781984 A1 | 9/2014 |
| JP | 2002258956 A | 9/2002 |
| JP | 2006155357 A | 6/2006 |
| JP | 2011048709 A | 3/2011 |

\* cited by examiner

LOW-DROPOUT VOLTAGE REGULATOR APPARATUS

This patent application is a national phase filing under section 371 of PCT/EP2015/063764, filed Jun. 18, 2015 which is incorporated herein by reference in its entirety.

TECHNICAL FIELD

The invention relates to a low-dropout voltage regulator apparatus and to a digital system comprising the low-dropout voltage regulator apparatus.

BACKGROUND

Many devices use low-dropout voltage regulators (LDO) to supply regulated power for highly integrated digital circuits. Generally, it is desirable to provide a stable regulated voltage in view of a wide variety of loads, operating supplies, etc.

LDO are often used to supply the highly integrated digital circuit through an external battery supply. Such highly integrated digital circuits normally operate synchronous to a system clock. In each clock cycle fast current spikes are induced causing a serve voltage change of an LDO output voltage. This may cause a malfunctioning of the highly integrated digital circuit. In general, a feasible on-chip output capacitor and an error amplifier with high bandwidth and slewing are used to provide a required load transient response. However, such an error amplifier with high bandwidth and slewing demands a corresponding current budget.

SUMMARY OF THE INVENTION

Embodiments of the invention provide a low-dropout voltage regulator apparatus with a reduced current consumption.

According to a first aspect, the invention is distinguished by a low-dropout voltage regulator (LDO) apparatus. The LDO apparatus comprises a voltage input coupleable to a power supply and an error amplifier. The error amplifier is coupled to the voltage input and configured to receive a reference voltage signal and a feedback voltage signal and to generate an output control signal dependent on the reference voltage signal and the feedback signal. The error amplifier comprises a current adjusting circuit. Furthermore, the LDO apparatus comprises a pass transistor coupled to the error amplifier and configured to receive the output control signal of the error amplifier and to provide an output current for an output of the low-dropout voltage regulator apparatus dependent on the output control signal. Additionally, the LDO comprises a detection circuit coupled to the voltage input and configured to provide an output signal on its output dependent on an input voltage provided on the voltage input of the LDO apparatus. The LDO apparatus comprises a bias generator coupled with the output of the detection circuit and configured to provide a bias current on a bias input of the current adjusting circuit of the error amplifier dependent on the output signal of the detection circuit.

Advantageously such an LDO apparatus is able to generate suitable bias currents for different modes. The LDO apparatus allows for using a feasible on-chip output capacitor and designing the error amplifier with sufficient bandwidth and slewing as in a tracking mode of the LDO apparatus a current consumption is reduced. When the supply voltage becomes low, the LDO apparatus enters the tracking mode. In the tracking mode the output voltage of the LDO apparatus starts to follow the input voltage of the LDO apparatus as much as possible.

Various embodiments provide that the lower the input voltage of the LDO apparatus the lower the quiescent current that is provided to the error amplifier through its current adjusting circuit. The current provided by the adjustable current continually decreases when the LDO apparatus passes from the regulation mode to the tracking mode. There is no need to secure an accurate set-point and switching the current of the LDO apparatus abruptly, which can lead to malfunction of the fast load transient response. Furthermore, the LDO apparatus does not require off-chip components. It may be fully integrated on an application-specific integrated circuit.

According to one embodiment of the first aspect, the bias current is proportional to a voltage difference between the input voltage of the LDO apparatus and a given reference voltage. Advantageously this allows for a cost-effective implementation of the detection circuit and the bias generator.

According to a further embodiment of the first aspect, the current adjusting circuit comprises a current mirror circuit configured and arranged to mirror the bias current of the bias generator to the error amplifier. Advantageously this allows for a cost-effective implementation of the current adjusting circuit.

According to a further embodiment of the first aspect, the low-dropout voltage regulator apparatus comprises an on-chip output capacitor. Advantageously the output capacitor provides instant current for a load transient.

According to a second aspect, the invention is distinguished by a digital system comprising a digital core and a low-dropout voltage regulator, LDO, apparatus according to the first aspect, wherein the voltage input of the LDO apparatus is coupleable to a battery supply and the output of the LDO apparatus is coupled to the digital core.

Advantageous embodiments of the first aspect are also valid for the second aspect.

BRIEF DESCRIPTION OF THE DRAWINGS

Exemplary embodiments of the invention are explained in the following with the aid of schematic drawings. These are as follows.

Elements of the same design and function that appear in different figures are identified by the same reference numerals.

DETAILED DESCRIPTION OF ILLUSTRATIVE EMBODIMENTS

Figure 1:
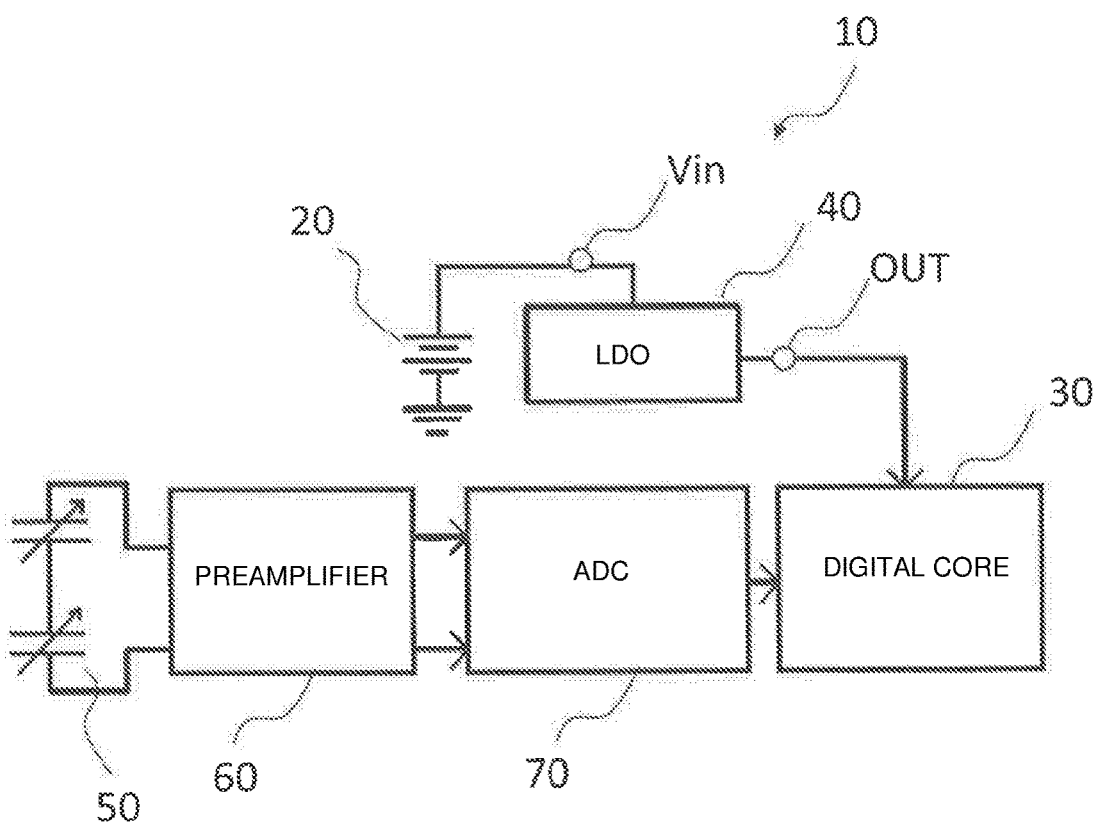
FIG. 1 is an exemplary block diagram of a digital system.

FIG. 1 shows an exemplary block diagram of a digital system 10 comprising a digital core 30 and a low-dropout voltage regulator apparatus (LDO apparatus) 40.

A voltage input Vin of the LDO apparatus 40 is coupled to a power supply 20. Preferably the power supply 20 is configured as a DC voltage power supply. For instance, the power supply 20 may comprise a battery.

An output OUT of the LDO apparatus 40 is coupled to the digital core 30. The LDO apparatus 40 is configured to generate a stable output voltage V_out and to output the stable output voltage V_out to the digital core 30.

The digital core 30 may comprise an application-specific integrated circuit (ASIC) and/or a processor.

The digital system 10 optionally comprises further circuit apparatus, for instance a microelectromechanical systems (MEMS) microphone 50 and/or a preamplifier 60 and/or an analog-to-digital converter 70, for instance, a sigma-delta modulator converter.

Figure 2:
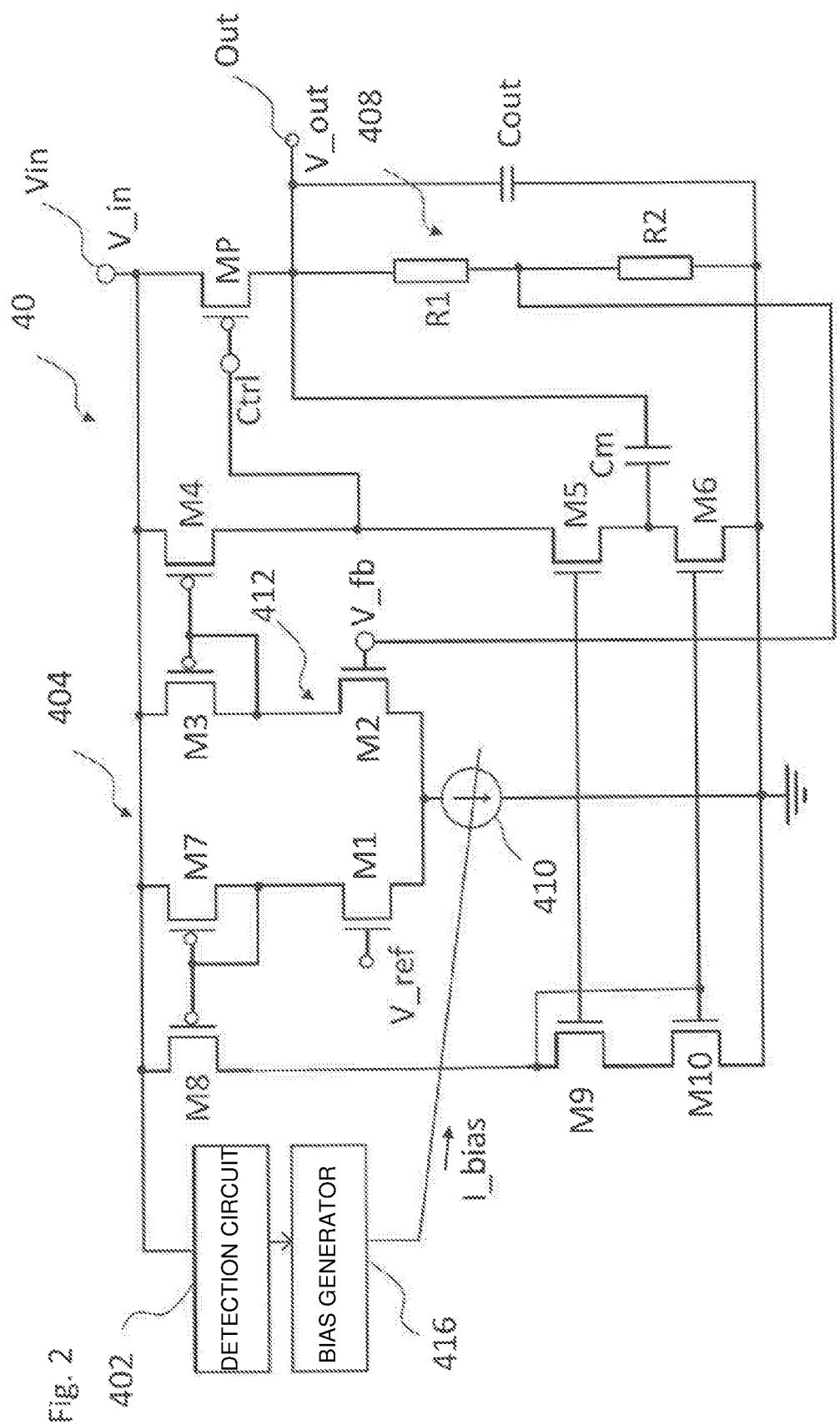
FIG. 2 is an exemplary block diagram of the low-dropout voltage regulator apparatus (LDO apparatus)

FIG. 2 shows an exemplary block diagram of the low-dropout voltage regulator apparatus (LDO apparatus) 40.

The LDO apparatus 40 comprises the voltage input Vin, a detection circuit 402, a bias generator 416, an error amplifier 404, a pass transistor MP and, for instance, a resistor network 408, a compensation capacitor Cm and an output capacitor Cout.

A capacity value of the output capacitor Cout depends on the requirements of a load transient response of the LDO apparatus 40. The output capacitor Cout provides instant current for the load transient.

The voltage input Vin is coupleable to the power supply 20.

The error amplifier 404 is coupled to the voltage input Vin and configured and arranged to receive a reference voltage V_ref and a feedback signal V_fd and to generate an output control signal Ctrl. A bandwidth and slewing of the error amplifier 404 dependents on the requirements of the load transient response of the LDO apparatus 40. The error amplifier 404 forms a fast regulation loop to react to the load transient.

The error amplifier 404, for instance, comprises a differential amplifier stage 412 with a first transistor M1 and a second transistor M2. For instance, the differential amplifier stage 412 of the error amplifier 404 comprises a current adjusting circuit 410. The differential amplifier stage 412 is arranged and configured to compare the reference voltage V_ref and the feedback signal V_fb. The error amplifier 404 is configured as a transadmittance amplifier. A differential voltage of the differential amplifier stage 412 is converted by a current output stage in an output current with a given gain.

The error amplifier 404, for instance, is configured as a wide range amplifier. The error amplifier 404 comprises, for instance, a pull-up stage and a pull-down stage for adjusting a voltage level of the current output stage. The error amplifier 404, e. g., comprises a current mirror with a third transistor M3 and a fourth transistor M4. A current drawn out of the third transistor M3 is replicated to a current out of the fourth transistor M4. A drain connection of the first transistor M1 is connected to a further current mirror formed by a seventh transistor M7 and an eighth transistor M8. Additionally, a current of the eighth transistor M8 is reflected one more time, through a tenth transistor M10 and a sixth transistor M6.

The major advantage of the wide-range amplifier is that the input voltage V_in applied on the voltage input Vin and an output voltage provided as the output control signal Ctrl to the pass transistor MP can run almost up to a supply voltage and almost down to ground, without affecting the operation of the circuit.

A fifth transistor M5 is, for instance, used as a cascode transistor for the sixth transistor M6. A ninth transistor M9 is, for instance, used for symmetry matching with the fifth transistor M5.

The pass transistor MP is configured and arranged to receive the output control signal Crtl of the error amplifier 404. A conduction degree of the pass transistor MP depends on the output control signal Ctrl such as the amount of current passing through the pass transistor MP is controlled by the output control signal Crtl of the error amplifier 404.

Hence, the pass transistor MP provides an output current to the output OUT of the LDO apparatus 40.

The detection circuit 402 is coupled to the voltage input Vin of the LDO apparatus 40. The detection circuit 402 is configured to monitor the input voltage V_in of the LDO apparatus 40.

The detection circuit 402 is configured to provide an output signal on its output dependent on a voltage level of the input voltage V_in of the LDO apparatus 40.

An input of the bias generator 416 is coupled with an output of the detection circuit 402. The bias generator 416 is configured to provide a bias current I_bias for the error amplifier 404 dependent on the output signal of the detection circuit 402.

The bias generator 416 comprises, for instance, a current generator.

Preferably, the bias generator 416 is configured to provide the bias current I_bias such that the bias current I_bias is proportional to the voltage level of the input voltage V_in of the LDO apparatus 40.

By injecting the bias current I_bias to the current adjusting circuit 410 of the error amplifier 404, a quiescent current of the error amplifier 404 is reduced dependent on a voltage drop of the input voltage V_in of the LDO apparatus 40.

The LDO apparatus 40 is used, for instance, to supply the digital core 30 through the battery. The supply voltage provided by the battery decreases over time and leads to two operation modes of the LDO apparatus 40, a regulation mode and a tracking mode.

When the supply voltage provided by the battery is high, the LDO apparatus 40 operates in the regulation mode. In the regulation mode the output voltage V_out of the LDO apparatus 40 provided on the output OUT does not depend on the input voltage V_in of the LDO apparatus 40. The output voltage V_out depends on the reference voltage V_ref and the resistor network 408. If the resistor network 408 comprises a voltage divider with resistors R1 and R2, the output voltage V_out of the LDO apparatus 40 may be defined by equation Eq. 1:

$$V\_out = V\_ref(1 + R\_1/R\_2), \qquad \text{Eq. (1)}$$

wherein V_ref is the reference voltage and R_1 and R_2 are the resistor values of the resistors R1 and R2.

When the supply voltage provided by the battery becomes low, the LDO apparatus 40 enters the tracking mode. In the tracking mode the output voltage V_out of the LDO apparatus 40 starts to follow the input voltage V_in of the LDO apparatus 40 as much as possible. The pass transistor MP operates in linear region. Thus, the output voltage V_out has a strong current driving ability enabling a fast load transient response. Therefore, there are no bandwidth and slewing requirements for the error amplifier 404 because it does not respond to the load transient. Basically, the error amplifier 404 can operate with very small operating current.

For reducing the current consumption in the tracking mode, the quiescent current of the error amplifier 404 is continually reduced against the voltage drop of the input voltage V_in of the LDO apparatus 40.

Figure 3:
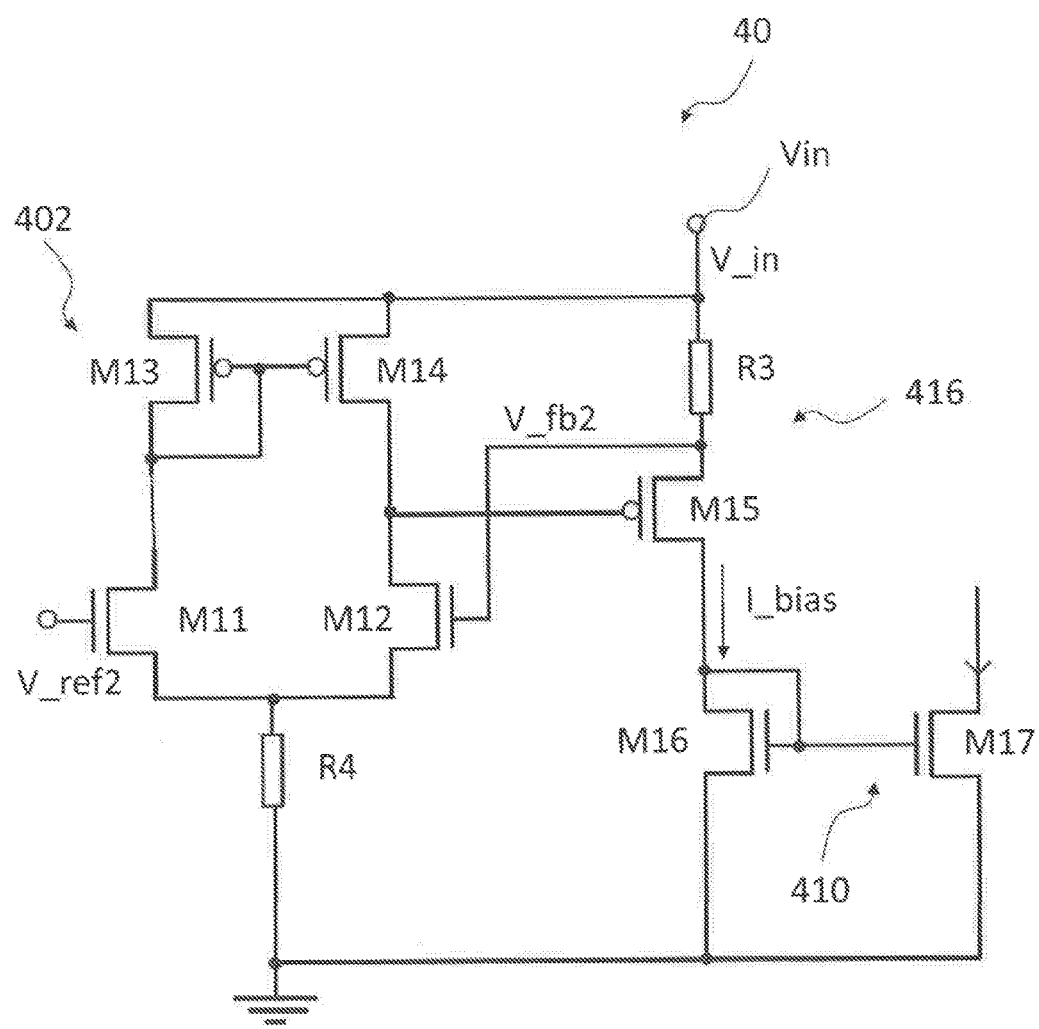
FIG. 3 is an exemplary circuit diagram of a detection circuit, a bias generator and a current adjusting circuit of an error amplifier.

FIG. 3 shows an exemplary circuit diagram of the detection circuit 402, the bias generator 416 and the current adjusting circuit 410 of the error amplifier 404.

The detection circuit 402 comprises, for instance, a single stage differential amplifier and a fifteenth transistor M15. The fifteenth transistor M15 may be configured as a field-effect transistor (FET), in particular an enhancement type p-channel field-effect transistor. For instance, the detection circuit 402 comprises an eleventh transistor M11 and a twelfth transistor M12 biased with resistor R4 forming the differential amplifier configured to lock a feedback voltage V_fb2 to a given reference voltage V_ref2 by unit gain negative feedback, wherein the reference voltage V_ref2 is applied to a gate of the eleventh transistor Mn and the feedback voltage V_fb2 is provided to a gate connection of the twelfth transistor M12. Additionally the detection circuit 402 comprises a thirteenth transistor M13 and a fourteenth transistor M14 forming a third current mirror. A current drawn out of the thirteenth transistor M13 is replicated to a current out of the fourteenth transistor M14. By the unity gain negative feedback, the feedback voltage V_fb2 is equal to V_ref2 so that the change of input voltage V_in can be detected as a difference between V_in and V_fb2.

The output signal of the detection circuit is the voltage difference between V_fb2 and V_in, and it is provided to the bias generator 416. The bias generator 416 is arranged and configured to provide a bias current I_bias to the adaptive current source 410 of the error amplifier 404, wherein the bias current I_bias depends on the input voltage V_in of the LDO apparatus 40. In particular, the bias current I_bias may be proportional to the voltage difference between the input voltage V_in of the LDO apparatus 40 and the given reference voltage V_ref2 applied to the gate of the eleventh transistor M11.

The bias generator 416 comprises, for instance, a resistor R3.

In this case, the bias current I_bias may be determined by equation Eq. (2):

$$I\_bias = (V\_in - V\_ref2)/R\_3, \quad \text{Eq. (2)}$$

wherein V_in is the input voltage of LDO apparatus 40, V_ref2 is the given reference voltage and R_3 the resistor value of the resistor R3.

The current adjusting circuit 410 of the error amplifier 404 comprises a fourth current mirror with a sixteenth transistor Mi6 and a seventeenth transistor M17. The fourth current mirror is arranged and configured to mirror the bias current I_bias of the bias generator 416 from the sixteenth transistor M16 to the seventeenth transistor M17. Thus, the current adjusting circuit 410 of the error amplifier 404 is realized by mirroring the bias current I_bias to the seventeenth transistor M17.

This leads to an automatic reduction of the quiescent current of the error amplifier 404 when the LDO apparatus 40 goes from the regulation mode to the tracking mode. Thus, the LDO apparatus 40 consumes a necessary amount of power when staying in the regulation mode enabling a desired operation of the error amplifier 404, and consumes less power when it approaches or enters the tracking mode.

The invention claimed is:

1. A low-dropout voltage regulator (LDO) apparatus comprising:
   a voltage input connectable to a power supply;
   an error amplifier coupled to the voltage input and configured to receive a reference voltage signal and a feedback signal and to generate an output control signal dependent on the reference voltage signal and the feedback signal, wherein the error amplifier comprises a current adjusting circuit;
   a pass transistor coupled to the error amplifier and configured to receive the output control signal of the error amplifier and to provide an output current for an output of the low-dropout voltage regulator (LDO) apparatus dependent on the output control signal;
   a detection circuit coupled to the voltage input and configured to monitor an input voltage provided on the voltage input of the low-dropout voltage regulator (LDO) apparatus and to provide an output signal on its output dependent on the input voltage provided on the voltage input of the low-dropout voltage regulator (LDO) apparatus; and
   a bias generator coupled to the output of the detection circuit and configured to provide a bias current on a bias input of the current adjusting circuit of the error amplifier dependent on the output signal of the detection circuit,
   wherein the low-dropout voltage regulator (LDO) apparatus comprises an on-chip output capacitor, and
   wherein the bias current is proportional to a voltage difference between the input voltage of the low-dropout voltage regulator (LDO) apparatus and a given reference voltage.

2. The low-dropout voltage regulator (LDO) apparatus according to claim 1, wherein the current adjusting circuit comprises a current mirror circuit configured and arranged to mirror the bias current of the bias generator to the error amplifier.

3. A digital system comprising a digital core and a low-dropout voltage regulator (LDO) apparatus, the low-dropout voltage regulator (LDO) apparatus comprising:
   a voltage input;
   an error amplifier coupled to the voltage input and configured to receive a reference voltage signal and a feedback signal and to generate an output control signal dependent on the reference voltage signal and the feedback signal, wherein the error amplifier comprises a current adjusting circuit;
   a pass transistor coupled to the error amplifier and configured to receive the output control signal of the error amplifier and to provide an output current for an output of the low-dropout voltage regulator (LDO) apparatus dependent on the output control signal;
   a detection circuit coupled to the voltage input and configured to monitor an input voltage provided on the voltage input of the low-dropout voltage regulator (LDO) apparatus and to provide an output signal on its output dependent on an input voltage provided on the voltage input of the low-dropout voltage regulator (LDO) apparatus; and
   a bias generator coupled to the output of the detection circuit and configured to provide a bias current on a bias input of the current adjusting circuit of the error amplifier dependent on the output signal of the detection circuit,
   wherein the voltage input of the low-dropout voltage regulator (LDO) apparatus is coupled to a battery supply and the output of the low-dropout voltage regulator (LDO) apparatus is coupled to the digital core,
   wherein the bias current is proportional to a voltage difference between the input voltage of the low-dropout voltage regulator (LDO) apparatus and a given reference voltage.

4. The digital system according to claim 3, wherein the current adjusting circuit comprises a current mirror circuit configured and arranged to mirror the bias current of the bias generator to the error amplifier.

5. The digital system according to claim 3, wherein the low-dropout voltage regulator (LDO) apparatus comprises an on-chip output capacitor.

6. A low-dropout voltage regulator (LDO) apparatus comprising:
- a voltage input connectable to a power supply;
- an error amplifier coupled to the voltage input and configured to receive a reference voltage signal and a feedback signal and to generate an output control signal dependent on the reference voltage signal and the feedback signal, wherein the error amplifier comprises a current adjusting circuit;
- a pass transistor coupled to the error amplifier and configured to receive the output control signal of the error amplifier and to provide an output current for an output of the low-dropout voltage regulator (LDO) apparatus dependent on the output control signal;
- a detection circuit coupled to the voltage input and configured to provide an output signal on its output dependent on an input voltage provided on the voltage input of the low-dropout voltage regulator (LDO) apparatus; and
- a bias generator coupled to the output of the detection circuit and configured to provide a bias current on a bias input of the current adjusting circuit of the error amplifier dependent on the output signal of the detection circuit,
- wherein the bias current is proportional to a voltage difference between the input voltage of the low-dropout voltage regulator (LDO) apparatus and a given reference voltage.

7. The low-dropout voltage regulator (LDO) apparatus according to claim 6, wherein the current adjusting circuit comprises a current mirror circuit configured and arranged to mirror the bias current of the bias generator to the error amplifier.

8. The low-dropout voltage regulator (LDO) apparatus according to claim 6, wherein the low-dropout voltage regulator (LDO) apparatus comprises an on-chip output capacitor.

* * * * *